Patented Apr. 26, 1932

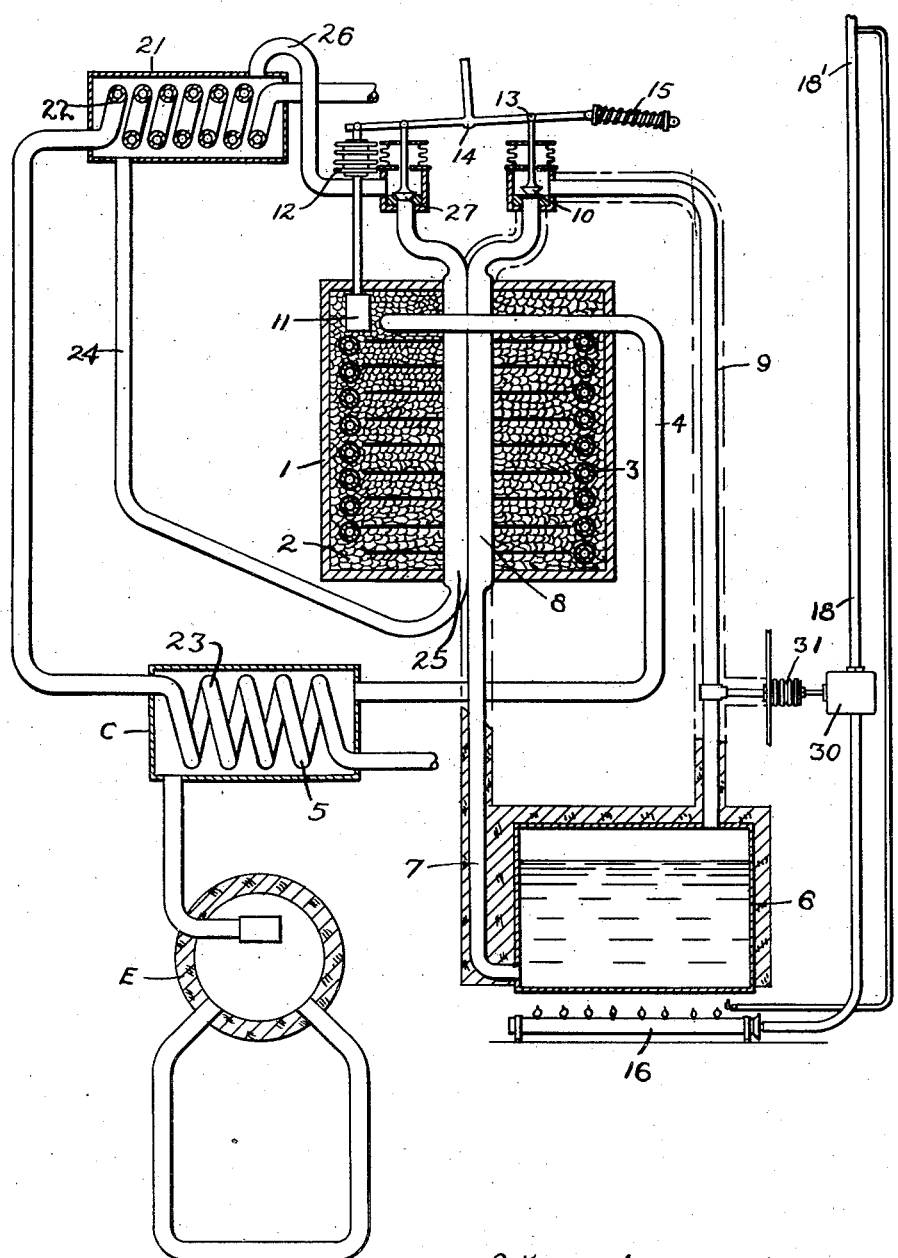

1,855,493

UNITED STATES PATENT OFFICE

HARRY F. SMITH, OF DAYTON, OHIO, ASSIGNOR TO FRIGIDAIRE CORPORATION, OF DAYTON, OHIO, A CORPORATION OF DELAWARE

REFRIGERATING APPARATUS

Application filed January 31, 1930. Serial No. 425,007.

This invention relates to refrigerating apparatus and more particularly to refrigerating apparatus of the intermittent absorption type.

In this type of apparatus it is customary to use a generator-absorber charged with an absorbent material, either solid or liquid, capable of absorbing, adsorbing and liberating large quantities of a refrigerant gas such as ammonia under varying degrees of temperature. During one period of operation known as the heating or distillation period, heat is applied to the generator-absorber whereby refrigerant gas is driven off from the absorbent material and is condensed in a condenser, collecting finally in the evaporator. During another period of operation known as the cooling or absorbing period the contents of the generator-absorber are cooled whereby the pressure within the system is reduced. The reduction in pressure causes the liquid refrigerant which has collected in the evaporator to evaporate and the vapors, passing back to the generator-absorber, are reabsorbed in the absorbent material therein.

It is to the method of and apparatus for heating and cooling the generator-absorber to which my invention has particular reference.

For one of its objects this invention contemplates increasing the efficiency of absorption refrigerating apparatus of the intermittent type by providing an improved method of and means for heating and cooling the generator-absorber.

A further object is to provide an improved heating and cooling means for the generator-absorber comprising a plurality of closed circuits, one for the circulation of a heating fluid and one for the circulation of a cooling fluid. More particularly to provide means whereby but a small mass of the fluid within the heating circuit will be cooled during the operation of the cooling circuit and but a small mass of cooling fluid will be heated during the operation of the heating circuit.

A still further object of this invention is to provide closed fluid circuits for both heating and cooling the generator-absorber and more particularly to prevent to a substantial degree the transfer of heat between the inoperative circuit and the generator-absorber during the operation of the other circuit.

Still another object of this invention is to provide closed circuits for heating and cooling the generator-absorber of an intermittent absorption machine and to provide means for constantly supplying heat to the heating circuit and for constantly cooling the cooling circuit.

Further objects and advantages of the present invention will be apparent from the following description, reference being had to the accompanying drawing, wherein a preferred form of the present invention is clearly shown.

In the drawing

The figure is a diagrammatic view of an intermittent absorption refrigerating machine embodying my improved heating and cooling means.

Referring to the drawing for a more specific explanation of my invention I have shown a refrigerating system as comprising a generator-absorber GA, a condenser C and an evaporator E. The generator-absorber is charged with dry solid material 2 such as calcium chloride capable of absorbing or adsorbing and liberating large quantities of refrigerant gas such as ammonia under varying conditions of temperature. The generator-absorber is provided with a perforated bleeder tube 3 shown as in the form of a coil and passing through the solid absorbent material. The lower end of this tube is closed and the other end continues outwardly in the form of an imperforate tube 4 from the generator-absorber to the condenser C which is provided with a cooling coil 5, and is connected to the evaporator E placed within a cabinet to be cooled.

The apparatus so far disclosed is conventional and operates in a conventional manner. Heat being applied to the generator-absorber, the ammonia absorbed in the calcium chloride is liberated and, passing through the perforations in the bleeder tube, flows through the tube 4 into the condenser where it is liquefied and collected in the evaporator E. When the absorbent material has reached a predetermined degree of desaturation, which may be determined in any known way, the heating cycle is terminated and the contents of the generator-absorber cooled whereby the pressure within the system is reduced. This reduction in pressure causes liquid refrigerant in the evaporator to evaporate, cooling the interior of the cabinet, the gas passing back to the generator-absorber where it is re-absorbed in the calcium chloride.

I will now describe the apparatuses for heating and cooling the generator-absorber which form the essence of this invention. The reservoir 6 containing a fluid such as water or other volatile fluid communicates at its lower portion with a conduit 7 which passes through the generator-absorber G. A. forming a condensing space 8 therein and is connected at its upper end to the top of the reservoir through the conduit 9. The reservoir 6, conduits 7 and 9 are insulated in some conventional manner as shown. The conduit 7 is provided with a snap acting valve 10 shown diagrammatically as operated by a thermostat 11 connected through the bellows 12 to operate the lever 13 which is pivoted at 14 and connected to the valve 10 and to the snap spring 15. The thermostat 11 may be responsive to the temperature within the generator-absorber as shown. Heat is applied to this heating circuit through the receptacle 6, below which is located a burner 16 provided with a pilot 17. The burner 16 is connected to a fuel supply 18 which fuel supply may or may not be provided with a valve at the point 18′. If a valve is provided at 18′, it may be linked to the lever 13 so that the fuel will be cut off whenever the valve 10 is closed. However, as shown, I prefer to supply heat to the receptacle 6 constantly, and to protect the heating system against undue high pressures, I may provide a throttle valve 30 in the fuel supply line. This valve 30 may be operated in response to the pressure within the heating system, for instance by a bellows 31 operatively connected to the valve 30 and in communication with the interior of the heating system. High pressure within the heating system will, therefore expand the bellows 31 to throttle the flow of fuel to the burner.

The cooling system is very similar to the heating system comprising a closed system including the receptacle 21 provided with a cooling coil 22 connected to the cooling coil 23 within the condenser C. The receptacle 21 communicates at its lower end with the conduit 24 which passes through the generator-absorber, forming a vaporizer section therein as shown at 25, returning to communicate with the top of the reservoir as shown at 26. This conduit is also provided with a valve 27 connected to lever 13 and operated by the thermostat 11. The cooling system contains a volatile liquid such as carbontetrachloride and it should be noted that water continually flows through the coil 22. Preferably the cooling of the generator-absorber should be substantially coincident with the heating thereof to avoid difficulties due to migration.

It will be seen, therefore, that when the temperature of the generator-absorber rises to a predetermined point representing the desired desaturation of the calcium chloride, the thermostat 11 will operate the lever 13 to open valve 27 and close valve 10. On the other hand when the temperature within the generator-absorber falls to that point representing the highest required degree of saturation, valve 27 will be closed and the valve 10 opened.

In operation, assume the material within the generator-absorber has absorbed the required amount of refrigerant and is in condition for the heating period. The thermostat 11 then operates the lever 13 to snap open valve 10 and close valve 27. The heating circuit is now open and the hot fluid in the reservoir 6 will vaporize, the vapors passing upwardly through the tube 9 past the open valve 10, will condense in the condenser section 8 within the generator-absorber, giving up their heat of condensation to the absorbent material.

During the heating period, the cooling circuit will be closed, that is to say, the valve 27 will be closed as hereinbefore described. During the heating period, there will be no cooling liquid in the vaporizer section 25 of the cooling system. This is due to the fact, that a part of the cooling liquid contained within the vaporizer section 25 at the beginning of the heating period will vaporize. The vaporization of this portion will force the remaining liquid upwardly through conduit 24 into the receptacle 21 where it will remain until the end of the heating period.

When the temperature rises to the point predetermined to represent the desired degree of desaturation of the absorbent material, the thermostat 11 will open valve 27 and close the valve 10. The circulation within the cooling circuit will start immediately, removing heat from the generator-absorber by vaporizing in the vaporizer section 25 of the tube 24 within the generator-absorber and condensing within the receptacle 21. The circulation within the heating circuit will stop. The vapors remaining within the condenser section 8 will condense, allowing some of the liquid in the container 6 to back up into the tube 7. In view of the fact, however, that the circulation within the heating system is prevented due to the closing of the valve 10, practically the only heating fluid that will be cooled will be that liquid within the condenser section 8.

It will be seen therefore that I have provided apparatus for heating and cooling the generator-absorber by the use of closed secondary circuits while at the same time preventing to a substantial degree the transfer of heat from one circuit to the other. By insulating conduits 7 and 9 and the receptacle 6 and preventing the circulation of the heating fluid during the cooling period, the temperature of the heating fluid may remain substantially constant throughout the cooling period. That is to say, I have provided indirect means for heating and cooling the contents of the generator-absorber by means of closed fluid circuits and means whereby only a very small fraction or mass of the fluid contained within either circuit must be reheated or recooled upon the initiation of that circuit. That is, it will be necessary to heat but a small fraction of the heating fluid upon the initiation of the heating period, that fraction being substantially equal to that retained within the condenser section 8 during the cooling or absorption period.

By providing the closed circuits for heating and cooling, I am enabled to constantly cool the cooling system and to thereby eliminate the use of valves for shifting the cooling water from the condenser to the generator-absorber. I am also enabled to utilize various sources of heat for heating the heating circuit, for example, waste heat from internal combustion engines, steam engines or the like.

While the form of embodiment of the invention as herein disclosed constitutes a preferred form, it is to be understood that other forms might be adopted, all coming within the scope of the claims which follow.

What is claimed is as follows:

1. In refrigerating apparatus of the intermittent absorption type, a generator-absorber, means for heating and cooling said generator-absorber including a closed circuit for a heating fluid and a closed circuit for a cooling fluid and means automatically operated upon the initiation of circulation within one of said circuits for preventing the circulation within the other of said circuits.

2. In refrigerating apparatus of the intermittent absorption type, a generator-absorber, means for heating and cooling said generator-absorber including a closed circuit for heating fluid, and a closed circuit for a cooling fluid, both of said circuits having a part arranged in heat exchange relation with said generator-absorber, means for continuously supplying heat to the said heating circuit, and means automatically operative upon the initiation of fluid circulation within said cooling circuit for preventing the circulation within said heating circuit.

3. In refrigerating apparatus of the intermittent absorption type, a generator-absorber, means for heating and cooling said generator-absorber including a closed fluid circuit for heating fluid and a closed circuit for cooling fluid, both of said circuits having a part arranged in heat exchange relation with said generator-absorber, means for continuously supplying heat to said heating circuit, means for continuously cooling said cooling circuit, and means automatically operative upon initiation of circulation within one of said circuits for preventing the circulation within the other of said circuits.

4. In a refrigerating system of the intermittent absorption type, a generator-absorber, means for heating and cooling said generator-absorber including a closed circuit containing a heating fluid and a closed circuit containing a cooling fluid, both of said circuits having a part arranged in heat exchange relation with said generator-absorber, means responsive to conditions within the system for starting the circulation within said heating circuit and means automatically operative upon the starting of circulation within said heating circuit for preventing the circulation of cooling fluid within said cooling circuit.

5. In a refrigerating system of the intermittent absorption type, a generator-absorber, means for heating and cooling said generator-absorber including a closed circuit for heating fluid and a closed circuit for cooling fluid, means responsive to conditions within the system for starting the circulation within one of said circuits and stopping the circulation within the other of said circuits.

6. In a refrigerating system of the intermittent absorption type, a generator-absorber, means for heating and cooling said generator-absorber including a closed circuit for heating fluid and a closed circuit for cooling fluid, both of said circuits having a part arranged in heat exchange relation with said generator-absorber, means responsive to conditions within the system for permitting circulation within said heating circuit and means cooperating with said circuits whereby but a small mass of heating fluid will be cooled during the circulation within the cooling circuit.

In testimony whereof I hereto affix my signature.

HARRY F. SMITH.